W. A. MILLER.
AUTOMOBILE TRANSMISSION.
APPLICATION FILED FEB. 2, 1917.

1,239,505.

Patented Sept. 11, 1917.
2 SHEETS—SHEET 1.

UNITED STATES PATENT OFFICE.

WALTER A. MILLER, OF EAST MILWAUKEE, WISCONSIN.

AUTOMOBILE TRANSMISSION.

1,239,505. Specification of Letters Patent. Patented Sept. 11, 1917.

Application filed February 2, 1917. Serial No. 146,058.

*To all whom it may concern:*

Be it known that I, WALTER A. MILLER, a citizen of the United States, and resident of East Milwaukee, in the county of Milwaukee and State of Wisconsin, have invented certain new and useful Improvements in Automobile Transmissions; and I do hereby declare that the following is a full, clear, and exact description thereof.

My invention relates to new and useful improvements in automobile transmission devices, and is more particularly directed to the provision of an arrangement whereby a relatively great degree of variation of gear ratio may be applied to adapt an automobile for use in its normal functions, involving a relatively low speed of travel, or for use as a tractor, involving a very low speed of travel in order to insure sufficient tractive power.

While it would be possible to provide this variation of gear ratio in the usual transmission mechanism, such an arrangement is impracticable in the ordinary type of automobile structures inasmuch as the rear wheel and the rear axle and differential structures thereof, are of such relatively light construction as not to be able to sustain the direct strain of excessive tractive power.

It is therefore primarily the object of my invention to provide a means for procuring a selective gear transmission at the drive wheels of the automobile, whereby the relatively great strain involved in the use of the automobile as a tractor is distributed in such means, to thus permit a normally rapid driving operation of the axle and differential structures, whereby such structures do not receive more than their usual load strain.

A further object resides in the provision of a variable transmission arrangement of this nature, which is comparatively simple and compact in structure, and which may be associated with conventional types of automobile structures, in a manner involving but slight modification thereof.

A still further object resides in the provision of an exceedingly simple shifting arrangement for said variable speed transmission.

A still further object resides in the provision of an arrangement, whereby when it is desired to drive an automobile provided with my invention at its normal rapid speed, the drive wheels are driven directly by their usual axle member.

With the above and other objects and advantages in view, the invention resides more particularly in the novel combination, formation and arrangement of parts hereinafter described and pointed out in the appended claims.

Figure 1:
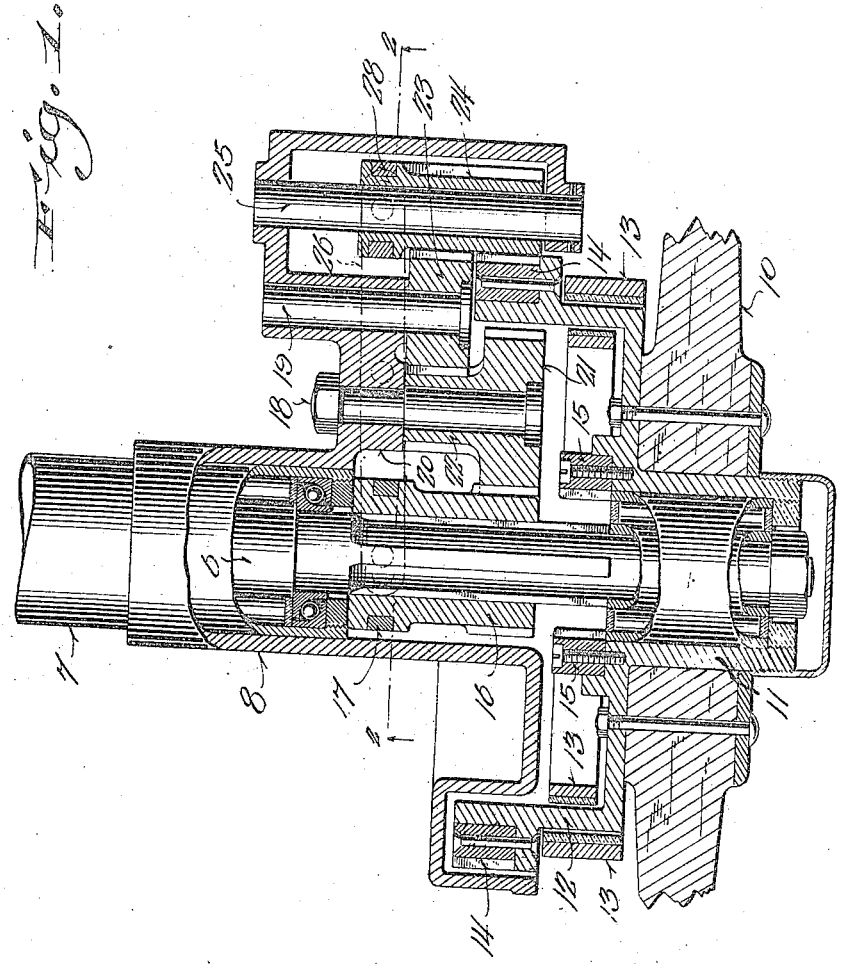
Figure 1 is a horizontal sectional view through a drive wheel transmission mechanism embodying my present invention, the plane of this view being indicated by the line 1—1 of Fig. 2.
Figure 2:
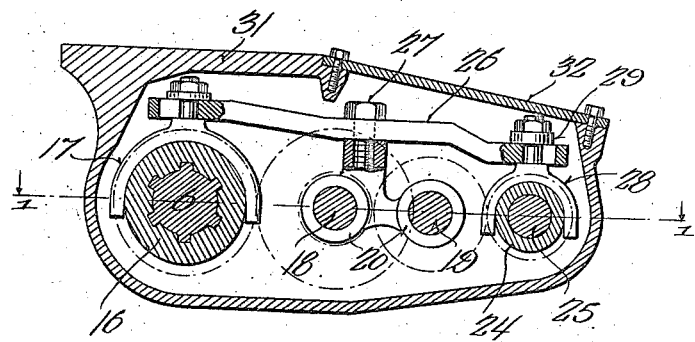
Fig. 2 is a vertical sectional view through the transmission mechanism on the line 2—2 of Fig. 1.
Figure 3:
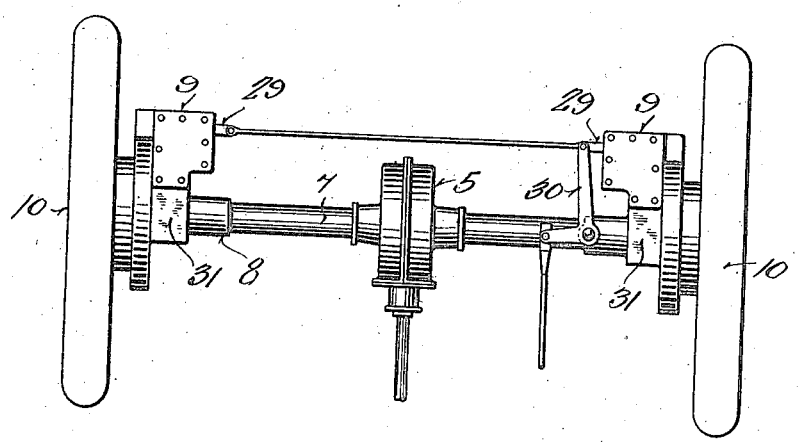
Fig. 3 is a plan view of the rear axle portion of an automobile, having my invention associated therewith.

Referring now more particularly to the accompanying drawings, 5 designates conventionally the differential of an ordinary type of automobile, from which extend the rear axle sections 6 inclosed in the usual casings 7, extending from the differential housing.

In the application of my invention, the housing 7 is cut off inwardly of the end of its corresponding axle section and a tubular housing 8 is disposed thereabout, which is projected from the rear inner side portion of a casing 9 for housing the gears involving my improved transmission device. Each axle section 6 is reduced adjacent its outer extremity and provided with longitudinal splined grooves, and the outer extremity of the axle is further reduced to form a journal spindle for a wheel 10. This wheel in addition to its usual roller bearings and means for securing it on the spindle, includes a hub section 11 having an outwardly offset flange 12 for engagement of the usual brake bands 13, and in my present arrangement this flange is extended into the housing for securement thereto of a tractor gear ring 14. Secured to the hub portion 11 is a direct drive clutch member comprising a ring 15 having gear teeth formed on its periphery and splined on the axle section 6 is a pinion 16 adapted for clutch engagement in the ring 15 whereby to impart a direct high speed drive to the wheel. This pinion 16 is provided with a sleeve portion grooved to receive a shifting yoke 17.

For driving the tractor gear ring 14 from the pinion 16, a pair of inner and outer stub shafts 18 and 19 are journaled in bosses 20 projecting inwardly from the inner wall of the housing 9. Journaled on the stub shaft 18 is a gear wheel 21 adapted to mesh with the pinion 16, and integrally projecting from the side of this gear wheel is a pinion 22 meshing with a gear wheel 23 on the stub shaft 19, this gear wheel 23 meshing in turn with an elongated pinion 24 which is also adapted to mesh with the tractor gear ring 14 and which is slidably journaled on a shaft 25 in the outer end of the housing. For simultaneously shifting the gear pinion 24 and the pinion 16 to selectively impart a tractor speed or a normal high speed to the wheel 10, a lever 26 is intermediately pivoted at 27 to a lateral projection of one of the bosses 20 and has a slotted connection at one end with the shifting yoke 17 of the pinion 16 and a slotted connection at its other end with a shifting yoke 28 engageable in a groove of the elongated pinion 24.

For operating the levers 26 of both of the transmission mechanisms, links 29 are pivoted to the ends of the levers adjacent the shafts 25 and extend inward for connection to a common lever 30 whereby both levers 26 may be simultaneously and conveniently operated from the forward portion of the automobile in any suitable manner.

It is noted that the rear upper portion of the housing 9 forms a pad or bed 31 for the usual automobile springs, and the forward upper portion of the housing comprises a removable plate 32, whereby ready access may be had to the gears.

By the present arrangement an automobile of conventional type may be readily geared down to a speed from two to four miles an hour, to develop sufficient tractive power for its use as a tractor, particularly in rural communities, this operation being effected without imparting an unusual strain to the normally relatively light rear axle and differential construction. At the same time, the efficiency of the automobile in its normal high speed functions is not to any degree effected, since a direct drive for the wheels may be procured from the rear axle sections.

While my device may of course be most readily and economically associated with an automobile during the manufacture thereof, it is obvious that by the arrangement shown in the drawings, my improved transmission device may be readily applied to the various existing types of automobiles now in common use.

While I have shown and described a preferred embodiment of my invention, it is obvious that to meet differing conditions of use, various changes and modifications of structure may be resorted to, without departing in any manner from the spirit of my invention, which comprises essentially the provision of independent variable speed transmissions between the drive wheels of an automobile and the adjacent shaft portions, whereby an exceedingly low speed for tractor purposes may be procured without involving unusual strain upon the normally light driving axle and differential structure.

What is claimed is:

1. The combination with a driven axle and its protecting casing, of a transmission housing mounted on the outer end of said casing, a wheel carrying hub journally mounted on the end of the axle outward of said housing, a drum carried by said hub and extending into the transmission housing, braking means engageable with the inner portion of said drum, and transmission means engageable with the end of said drum in the housing.

2. The combination with a driven axle and its protecting casing, of a transmission housing having its end wall continued and secured to the outer end of said casing, a wheel carrying hub mounted on the end of said axle outward of said housing, an outwardly offset flange carried by said hub and extending into said housing, braking means engagable with the inner portion of said flange, a gear carried by the outer portion of said flange, and means selectively engageable with said gear to provide a slow speed.

3. In an automobile, the combination with a drive wheel and adjacent drive axle portion, of a hub carrying a ring gear, a pinion gear slidably fixed to the axle and engageable with said ring gear to procure a direct drive of the wheel from said axle, and means operable by the moving of said pinion gear from engagement with the ring gear to provide a slow speed, substantially as described.

4. In an automobile, the combination of drive axle portions, drive wheels rotatably mounted thereon, clutch members carried by the drive wheel, a gear clutch member splined on each drive axle portion, a tractor drive gear on each of said wheels, reducing gears adapted to mesh with said drive gear, said clutch being shiftable to selectively engage the clutch members of the wheel and the reducing gears, and coacting means controlling the meshing engagement of the reducing gears with the tractor gear.

5. The combination with a driven axle and its protecting casing, of a transmission housing mounted on the outer end of said casing, a wheel carrying hub journally mounted on the end of the axle outward of said housing, a drum carried by said hub and extending into the housing, braking means engageable with the inner portion of said drum, a gear carried by the outer end of said drum, a train of gears journaled in said housing, an elongated pinion slidably mounted in said casing and adapted to simultaneously mesh with one gear of said train and the drum carried gear, and axle carried means adapted to mesh with the other gear of said train to drive said drum carried gear.

6. The combination with a driven axle and its protecting casing, of a transmission housing mounted on the outer end of said casing, a wheel carrying hub journally mounted on the end of said axle outward of said housing, a drum carried by said hub and having its outer portion extending into said housing, braking means engageable with the inner portion of said drum, a ring gear carried by the outer end of said drum, a pair of reducing gears journaled in said housing and in mesh, an elongated pinion gear slidably journaled in the housing and adapted to simultaneously mesh with one of said reducing gears and said drum carried gear, a clutch member carried by said hub, a gear clutch member slidably splined on said axle, said clutch being shiftable to selectively engage the clutch member of the wheel and the other of said reducing gears, and means connected with said elongated pinion and gear clutch member whereby to provide varying speeds.

In testimony that I claim the foregoing I have hereunto set my hand at Milwaukee, in the county of Milwaukee and State of Wisconsin, in the presence of two witnesses.

WALTER A. MILLER.

Witnesses:
FRANK S. RATCLIFFE,
M. E. DOWNEY.

Copies of this patent may be obtained for five cents each, by addressing the "Commissioner of Patents, Washington, D. C."